UNITED STATES PATENT OFFICE.

THILO KROEBER, OF BASEL, SWITZERLAND, ASSIGNOR TO THE FIRM OF SOCIETY OF CHEMICAL INDUSTRY IN BASLE, OF BASEL, SWITZERLAND.

MONOAZO DYE AND PROCESS OF MAKING SAME.

No. 835,539.    Specification of Letters Patent.    Patented Nov. 13, 1906.

Application filed January 30, 1906. Serial No. 298,724. (Specimens.)

*To all whom it may concern:*

Be it known that I, THILO KROEBER, chemist and doctor of philosophy, a subject of the Duke of Saxe-Altenburg, and a resident of Basel, Switzerland, have invented new and useful Improvements in Monoazo Dyes and Process of Making the Same, of which the following is a clear and complete specification.

It is known that the orthodiazonaphtholsulfonic acids—as, for instance, the 1:2-diazonaphthol-4-sulfonic acid—are not able to be combined smoothly with alpha-naphthol in alkaline solutions—that is to say, in solutions containing a caustic alkali or an alkaline carbonate, as it is usually practiced in the manufacture of azo dyestuffs. I have made the surprising discovery that nevertheless a smooth combination of an orthodiazonaphtholsulfonic acid with alpha-naphthol takes place when it is effected in presence of suitable neutral or basic organic compounds—as, for instance, alcohol, pyridin, anilin, &c.—and that the presence of these organic compounds facilitates generally the combination of the orthodiazonaphtholsulfonic acids with azo coloring-matter components.

The new monoazo dyestuffs derived from orthodiazonaphtholsulfonic acids and alpha-naphthols dye wool in an acid-bath brownish-violet tints, which turn to beautiful black fast to milling, washing, potting, and light when subsequently treated with chromium compounds. They dissolve in water with violet to blue colorations and in concentrated sulfuric acid with greenish-blue colorations.

Example: Forty-five parts, by weight, of alpha-naphthol are dissolved in four hundred parts, by weight, of alcohol (of ninety-five per cent.) with the addition of eighty parts, by weight, of soda-lye, (of thirty per cent.) While stirring and at a low temperature of about 5° to 10° centigrade such a quantity of dry and pulverized diazonaphtholsulfonic acid as corresponds to seventy-two parts, by weight, of 1:2:4-amidonaphtholsulfonic acid (of one hundred per cent.) are gradually added. The reaction mass shows at first a reddish-violet color, which turns gradually to greenish blue, the separation of the dyestuff partly taking place at the same time. After about one hour it is heated, at about 45° centigrade, until the complete disappearing of the diazo compound, which may be tested on test-paper with a warm alkaline resorcin solution in the usual well-known manner. The combination being completed, the thus obtained paste is dissolved in fifteen hundred parts, by weight, of hot water, (of 60° to 70° centigrade.) On the addition of a certain quantity of hydrochloric acid (of 19° Baumé)—as, for example, of about sixty parts, by weight—the dyestuff separates as a crystalline brown mass which is separated by filtration, pressed, and dried. It forms a brownish-black powder with bronze-like luster soluble in hot water with a violet color, in concentrated sulfuric acid with a greenish-blue color, blackish-violet flakes being separated on the addition of ice-water to the said solution.

The dyestuff produces on wool in an acid-bath brownish-violet shades, which on treatment with a chromium compound change to a beautiful bluish black of great fastness against milling, washing, and light. The shades are not altered by artificial light.

The described process for the production of the said dyestuff may be varied as to temperature, quantity, and force of the employed alcohol. Also other suitable organic diluents—as, for instance, pyridin, anilin, &c.—may be substituted for the alcohol.

In the foregoing example the 1:2-diazonaphtholsulfonic acid may be replaced by other orthodiazonaphtholsulfonic acids—as, for instance, 1:2-diazonaphthol-6-sulfonic acid, 2:1-diazonaphthol-4-sulfonic acid, 2:1-diazonaphthol-5-sulfonic acid, 1:2-diazonaphthol-3:6-disulfonic acid, 1:2-diazonaphthol-4:6-disulfonic acid, 2:1-diazonaphthol-5:7-disulfonic acid, &c.—whereby similar monoazo dyestuffs are obtained, which dissolve in dilute solutions of sodium carbonate with blue color and in concentrated sulfuric acid with greenish-blue color.

What I claim is—

1. The process for the manufacture of monoazo dyestuffs which consists in combining an orthodiazonaphtholsulfonic acid with an azo coloring-matter component in presence of one of the herein-described organic compounds, substantially as described.

2. The process for the manufacture of monoazo dyestuffs, which consists in combining an orthodiazonaphtholsulfonic acid with alpha-naphthol in presence of one of the herein-described organic compounds, substantially as set forth.

3. As new products the monoazo dyestuffs derived from orthodiazonaphtholsulfonic acids and alpha-naphthol, which yield violet to blue solutions in water, greenish-blue solutions in concentrated sulfuric acid and dye unmordanted wool in brownish-violet shades, becoming black on treatment with chromium compounds.

4. As a new article of manufacture the described monoazo dyestuff derived from 1:2-diazonaphthol-4-sulfonic acid and alpha-naphthol, which yields violet solutions in water, greenish-blue solutions in concentrated sulfuric acid and dyes unmordanted wool in brownish-violet shades, becoming blue-black on treatment with chromium compounds.

In witness whereof I have hereunto signed my name, this 16th day of January, 1906, in the presence of two subscribing witnesses.

THILO KROEBER.

Witnesses:
GEO. GIFFORD,
AMAND RITTER.